May 22, 1951 — W. ZACREP — 2,553,697
ATTACHMENT FOR SHEARS AND THE LIKE
Filed Feb. 9, 1949
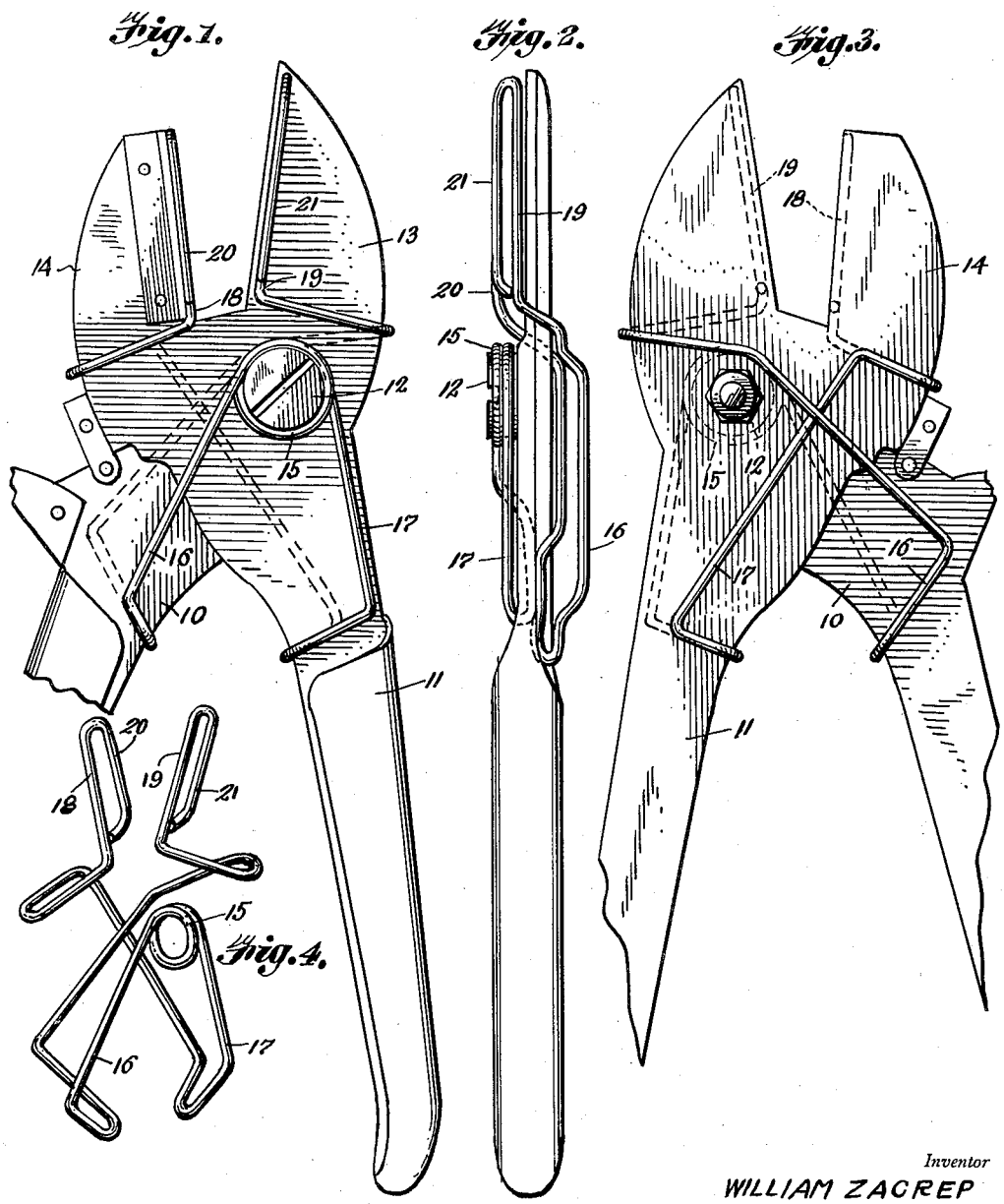
Inventor
WILLIAM ZACREP
By Patrick D. Beavers
Attorney Patented May 22, 1951

2,553,697

UNITED STATES PATENT OFFICE 2,553,697

ATTACHMENT FOR SHEARS AND THE LIKE

William Zacrep, Williston, N. Dak.

Application February 9, 1949, Serial No. 75,374

1 Claim. (Cl. 30—135)

The present invention relates to attachment for shears and the like and it consists in the combinations, constructions and arrangements of parts herein described and claimed.

Generally there is provided an attachment for shears and the like which is particularly adaptable to pruning shears and which consists of a device formed of a single piece of spring wire formed into a pair of handle engaging members and a pair of arms adapted to normally move with the blades of the shears. One portion of the wire is looped to engage a bolt head commonly found on all shears. The outer arms of the device are adapted to engage the stalks of plants which have been cut by the shears to hold the same until they may be deposited by the user of the shears.

It is accordingly an object of the invention to provide a device of the character set forth which is extremely simple in construction and operation and yet which is very effective and efficient in use.

Another object of the invention is to provide a gripping attachment for shears which will hold cuttings firmly and yet gently.

Another object of the invention is the provision of a device of the character described which will work equally well whether the user of the shears is right or left handed and which will not interfere with the use of the shears in their conventional work.

A further object of the invention is the provision of a device of the character set forth which may be quickly and easily mounted and/or removed from a pair of shears.

Other and further objects of the invention will become apparent from a reading of the following specification taken in conjunction with the drawing, in which:

Figure 1 is a plan view of an embodiment of the invention,

Figure 2 is a side elevational view of Figure 1,

Figure 3 is a plan view taken from the opposite side to that of Figure 1, and

Figure 4 is a perspective view of the attachment forming the present invention.

Referring more particularly to the drawing, there is shown therein a pair of pliers having the conventional handles 10 and 11 pivoted upon the bolt 12 and terminating in cutting jaws 13 and 14, respectively.

The device forming the present invention is formed of a single piece of wire bent to form a loop 15 for engaging the bolt 12 and extending in one direction to form a pair of handle gripping members 16 and 17 and in another direction to form a pair of plant gripping arms 18 and 19 each provided with an integrally formed lateral extension, 20 and 21, respectively.

It will be seen that the attachment, being formed of spring metal, is so positioned upon the shears that the arms 16 and 17 tend to force outwardly the handles 10 and 11 of the shears and that when the handles 10 and 11 are brought together in the cutting action of the shears, the arms 18 and 19 together with their extensions 20 and 21 are likewise brought together. This operation will cause the plant or other object which has been cut by the shears to be held by the arms 18 and 19 and their extensions 20 and 21 without, however, crushing the same since the tension of the attachment is regulated either by the manufacturer of the device or by the user.

It will also be apparent that the device may be readily attached to the shears or removed therefrom. To remove the attachment it is only necessary to move the arms 18 and 19 toward one another with the fingers and release the loop 15 from the bolt 12 and move the entire device downwardly between the handles 10 and 11 as viewed in Figure 1. To mount the device the reverse of this action will be had.

While but one form of the invention has been shown and described herein, it will be readily apparent to those skilled in the art that many minor modifications may be made without departing from the spirit of the invention or the scope of the appended claim.

What is claimed is:

In combination with pruning shears having a pair of handles, a pivot bolt interconnecting the handles and each handle having an integrally formed coacting blade beyond said pivot bolt, the provision of an attachment for said shears comprising a single piece of spring wire having a looped portion encircling said pivot bolt, a pair of handle-engaging arms each provided with a socket encompassing the inner side of a handle, a pair of blade-engaging arms each provided with a socket encompassing the outer side of a blade, and a pair of spaced gripping arms extending in parallel relation to each of the inner ends of said blades.

WILLIAM ZACREP.

REFERENCES CITED

The following references are of record in the file of this patent:

UNITED STATES PATENTS

| Number | Name | Date |
|--------|------|------|
| 633,736 | Schoonover | Sept. 26, 1899 |